Oct. 6, 1959 J. W. SKAGGS 2,907,958
SIGNAL DELAY MEANS
Filed Sept. 27, 1956
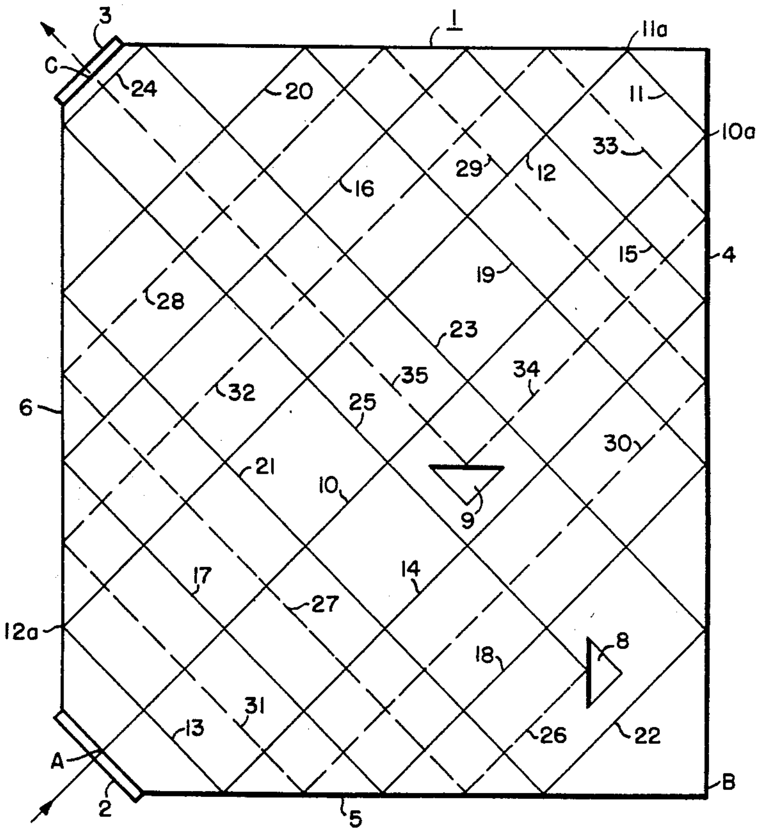
WITNESSES
Leon J. Taya
George Thompson Jr
INVENTOR
John W. Skaggs
BY
Paul E. Friedemann
ATTORNEY United States Patent Office
2,907,958
Patented Oct. 6, 1959

2,907,958

SIGNAL DELAY MEANS

John W. Skaggs, Silver Spring, Md., assignor to Westinghouse Electric Corporation, East Pittsburgh, Pa., a corporation of Pennsylvania Application September 27, 1956, Serial No. 612,481

4 Claims. (Cl. 333—30)

This invention relates to a signal delay means and more particularly to a solid crystal type delay line.

In many electronic applications it is desirable to delay a signal for a period of time. For very short delay times, that is, of the order of a very few microseconds, electronic delay lines composed of inductors and capacitors are often employed. However, when delay lines of several microseconds are required, the difficulty of constructing a suitable electronic delay line makes it advisable to employ other means for delaying the signal. The so-called crystal delay line is often employed in instances where the delay required is greater than the delay that can be conveniently obtained by means of electronic delay lines.

In the usual crystal delay line a pulse of energy is introduced at a selected point and detected at a second point a predetermined distance from the first point. This energy is detected to provide an output signal from the delay line. The time of delay of such delay line is the time required for the energy to travel the distance between the above-mentioned two points. This time may be accurately calculated from the properties of the transmission medium and the length of the path traveled by the energy.

Several methods of obtaining increased time delay through the use of solid crystal devices have been used. For example, energy introduced into the crystal at an angle whose angle of incidence with respect to and upon striking a reflecting wall is of a value less than 45° would cause the resulting traveled paths of energy within the crystal to be generally non-symmetrical and in some instances cause the energy to be transformed from a transverse wave form to a compressional wave form and vice versa, each time it is reflected. Although this method provides some additional time delay, energy travel within the crystal while in the compression mode is of a more rapid rate than the transverse wave-form mode. A portion of the gained time by the increased length of travel is, therefore, lost in the faster rate of travel of the energy while in the compressional wave form.

It is, therefore, an object of this invention to provide a novel crystal-type delay line providing a substantially increased delay time while being of small physical size.

It is a further object of this invention to provide a crystal delay line having a large number of energy delay paths while at the same time maintaining the energy in transverse wave form.

Other objects and advantages will become apparent from a study of the following specification when considered in conjunction with the accompanying drawing in which:

The single figure is a schematic diagram of a crystal delay line embodying this invention.

In practicing this invention a delay line crystal, usually of quartz, is formed with a plurality of triangular openings therein. The openings are positioned to intercept and redirect any energy introduced into the crystal over additional paths within the crystal, thus providing an additional time delay before emission of the energy from the crystal.

In the figure of the drawing, there is shown a delay line crystal 1 usually constructed of quartz and provided with a transmitting piezoelectric crystal 2 and a receiving piezoelectric crystal 3. The delay line crystal 1 is shown rectangular in shape (although other shapes may be used) and bounded by the sides 4, 5, 6 and 7. Positioned within the delay line crystal 1 is a pair of triangular openings 8 and 9 provided with reflecting sides or surfaces, the purpose of which will be set forth hereinafter. It is sufficient to state at this time that the two triangular openings 8 and 9 are provided to increase the number of reflected paths traversed by energy introduced into the delay line crystal 1.

It is felt that a description of the actual path taken by energy introduced into the delay line crystal 1 by the transmitting crystal 2 is the best mode for the proper explanation of this invention.

Energy introduced into the delay line crystal 1 at point A by the transmitting crystal 2 takes the form of a mechanical or vibrational transverse wave at the junction between the transmitting crystal and the delay line crystal and then travels a path 10 striking the boundary 4 of the crystal 1 at the point 10*a*. The angle at which the energy strikes the boundary limit 4 of the crystal 1 is approximately 45° causing the energy to take a reflected path 90° to its original path, designated 11.

In each of the following reflections of the energy within the crystal, the reflected energy travels at an angle of 90° to the previous reflected path. It can be seen, therefore, that the energy traveling the path 11 strikes at the point 11*a* and is reflected at a 90° path 12 to the point 12*a* and subsequently along the paths 13 through 25. This path is shown by solid line since it is the path the energy would take in a delay line not involving this invention. Without the introduction of the triangular opening 8 in the delay line crystal 1, the energy would normally leave the crystal 1 at the corner B. The insertion of the triangular opening 8, however, in the position displayed in the drawing causes the energy to take up a new path 26 and thus follow the path shown by the dotted line 26 through 34, at which time the energy again strikes the surface of another triangular opening 9 used to direct the mechanical or vibrational energy to the receiving crystal 3 where it is again transformed into electrical impulses. The point of departure of the energy is designated as C.

It can be seen that the dotted line shown in the schematic diagram represents the additional paths provided by this invention over prior known crystals.

Through the use of these triangular shaped openings in the delay line crystal, the delay time can be increased by 65 percent. For example, for two crystals of the same dimensions, the delay time is increased from 340.8 microseconds to 523.8 microseconds. It can be seen, therefore, that crystal sizes can be made smaller for a given time delay thus providing more space for other equipment where space is limited.

Although the disclosed delay line crystal is provided with only two triangular openings, it should be clear that more reflecting openings might possibly be used to provide a longer delay time period.

The foregoing disclosure and the showing made in the drawing are merely illustrative of the principles of this invention and are not to be construed in a limited manner. The only limitations are to be determined from the scope of the appended claims.

I claim as my invention:

1. A delay line comprising a rectangular block of solid crystal material, a first means secured to said block for introducing mechanical energy in a transverse wave form into said block and positioned to cause subsequent paths of said energy within said block to be in the transverse wave form, surfaces formed by openings in said block, said surfaces being in a position to redirect said energy through additional paths, and a second means secured to said block in a position to receive said redirected mechanical energy.

2. A delay line comprising a rectangular block of solid crystal material, a first means secured to said block for introducing mechanical energy into said block in transverse wave form and positioned to cause subsequent paths of said mechanical energy within said block to be in transverse wave form, a reflecting triangular opening in said block for redirecting said energy through additional paths in said block, and a second means secured to said block in a position to receive said redirected mechanical energy, said reflecting means comprising the sides of a pair of openings formed in said block.

3. A delay line comprising a rectangular block of solid crystal material, a first means secured to said block for introducing mechanical energy into said block in transverse wave form and positioned to cause subsequent paths of said energy within said block to be in transverse wave form, a reflecting triangular opening in said block for redirecting said energy through additional paths in said block, and a second means secured to said block in a position to receive said redirected mechanical energy, said reflecting means comprising one side of each of a plurality of openings in said block.

4. A delay line comprising a rectangular block of solid crystal material, a first means secured to said block for introducing mechanical energy into said block in transverse wave form and positioned to cause subsequent paths of said energy within said block to be in transverse wave form, a reflecting triangular opening in said block for redirecting said energy through additional paths in said block, and a second means secured to said block in a position to receive said redirected mechanical energy, said reflecting means comprising the surface of one triangular opening for redirecting the energy through said block and the surface of a second triangular opening positioned to redirect the energy to said second means.

References Cited in the file of this patent

UNITED STATES PATENTS

| | | |
|---|---|---|
| 2,055,684 | Eppenstein | Sept. 29, 1936 |
| 2,189,298 | Rantsch | Feb. 6, 1940 |
| 2,240,988 | Hertel | May 6, 1941 |
| 2,527,986 | Carlin | Oct. 31, 1950 |
| 2,592,135 | Firestone | Apr. 8, 1952 |
| 2,712,638 | Arenberg | July 5, 1955 |
| 2,781,494 | Geohagen | Feb. 12, 1957 |